United States Patent [19]

Wolfe, Jr.

[11] 4,378,964

[45] Apr. 5, 1983

[54] INTERNALLY INSULATED EXTRUSION DIE

[75] Inventor: John R. Wolfe, Jr., Rogers, Ark.

[73] Assignee: TRW Inc., Cleveland, Ohio

[21] Appl. No.: 110,515

[22] Filed: Jan. 8, 1980

[51] Int. Cl.³ ............................................. B29B 1/03
[52] U.S. Cl. ................................... 425/463; 264/142
[58] Field of Search ................ 425/311, 313, 67, 461, 425/463; 264/142

[56] References Cited

U.S. PATENT DOCUMENTS

| | | | |
|---|---|---|---|
| 3,230,582 | 1/1966 | Hoffman et al. | 425/67 |
| 3,271,822 | 9/1966 | Rhino | 425/461 |
| 3,436,449 | 4/1969 | Treu et al. | 425/311 |
| 3,452,394 | 7/1969 | McNeal | 425/197 |
| 3,516,120 | 6/1970 | Braun et al. | 425/67 |
| 3,599,285 | 8/1971 | Hamilton | 425/311 |
| 3,867,082 | 2/1975 | Lambertus | 425/313 |

FOREIGN PATENT DOCUMENTS

| | | | |
|---|---|---|---|
| 2247148 | 4/1973 | Fed. Rep. of Germany | 425/464 |
| 2517402 | 10/1976 | Fed. Rep. of Germany | 425/464 |
| 1400426 | 7/1975 | United Kingdom . | |
| 1498322 | 1/1978 | United Kingdom . | |

Primary Examiner—Jay H. Woo
Attorney, Agent, or Firm—Daniel G. Blackhurst

[57] ABSTRACT

An extrusion die of the type particularly suited for use in underwater pelletizing of polymeric materials. The die includes a die body having a forward end face with a plurality of extrusion ports passing therethrough terminating at the forward end face. A layer of insulating material is interposed between the forward end face at the area of the extrusion ports and a subplate which is constructed from the same material as the die body. The subplate is fixedly secured to the die body so as to form a substantially integral relationship therewith. A hardened facing construction is fixedly secured to the outer end face of the subplate. Both the facing and subplate allow communication therethrough with the extrusion ports. The insulating material retards or reduces heat transfer from the heated die body to the cooled facing during an extruding operation. A die body heating fluid flow passage in heat transfer relationship with the extrusion ports may include insulating material on a portion of the side walls thereof. Also, insulating material may be included on the die body forward end face radially adjacent the hardened facing.

3 Claims, 3 Drawing Figures

INTERNALLY INSULATED EXTRUSION DIE

BACKGROUND OF THE INVENTION

This invention pertains to the art of extrusion dies and more particularly to extrusion dies for synthetic resin or polymeric materials.

The invention is particularly applicable to a so-called underwater extrusion die for use in pelletizing synthetic resins or polymeric materials and will be described with particular reference thereto. However, it will be appreciated by those skilled in the art that the invention has broader applications and may be adapted to use in other environments.

In extruding synthetic resins and similar materials to form pellets, the extruded material is cut into pellet form by a knife which periodically wipes across the external face of an extrusion die. The interior of the die is maintained at elevated temperatures for retaining the resins in a generally fluid or flowable state. However, the external face of the die where the wiping or cutting action takes place must be maintained at much lower temperatures so that the material being extruded will solidify substantially simultaneous with its exit from the die. Typically, the external die face is submerged in a cooling fluid bath such as water or the like to achieve necessary cooling. The resultant uneven heating and cooling causes a great deal of expansion and contraction of the die which can adversely affect die operation and effective die life.

In this type of extruding equipment, it is considered particularly advantageous to design and construct the die in a manner such that at least the external die face which periodically receives the knife wiping or cutting action has a much greater hardness than the die body itself for reducing die wear. Hard facing tungsten carbide tiles or the like are typically used for facing the external die face with one such carbide facing arrangement being shown and described in the commonly assigned U.S. Pat. No. 3,271,822. While this particular patent has helped solve problems encountered with wear generated by the knives running against the die face, certain operational difficulties are still encountered during extruding operations.

More particularly, such dies have not operated in an entirely efficient manner due to the rapid heat conductivity of the face which conducts heat outwardly away from the die body. Because of this, the synthetic resin or polymeric material passing through the extrusion holes or ports can often cool sufficiently to solidify and thereby plug the ports. This problem is referred to in the trade as "freeze off" and is caused simply by the inability to maintain a sufficient temperature in the area surrounding the extrusion ports adjacent the facing. The occurrence of freeze off results in an undesired reduction in production capacity. Ultimately, the die must be removed from production for purposes of cleaning the plugged ports.

There have been some previous efforts at overcoming freeze off which have met with varying degrees of success. For example, insulating type coatings on the facing have been used but this approach substantially shortens effective face life. In addition, combinations of hard facing and insulating coatings on the face have helped reduce the problem somewhat, but this approach similarly has the drawback of limited operational life. Still further, some users have utilized a so-called heat exchanger die plate but here too, freeze off remains as a recurring difficulty.

Since tungsten carbide facings provide the best production life for these dies, it has been considered extremely desirable to develop means for more effectively insulating the die body from such facing constructions. Preferably, the manner of insulation should not cause any loss of effective die life and substantially eliminates loss of production capacity due to freeze off. The subject invention is deemed to meet the aforementioned specific needs as well as others commonly associated with this general type of extrusion die.

BRIEF DESCRIPTION OF THE INVENTION

In accordance with the present invention, a new and improved extrusion die construction is provided wherein the die body is internally insulated from a die body facing. The facing is constructed from a material which is much harder than the material from which the die body is constructed and which has very rapid heat conductivity characteristics. The internal insulation eliminates any wear or loss in insulating effectiveness during normal extruding operations.

In accordance with a preferred arrangement of the present invention, the die body is constructed from a first material including a plurality of extrusion ports extending therethrough terminating at the die body forward end face. A layer of insulating material is interposed between the forward end face at least at the area of the extrusion ports and a subplate which is constructed of a material compatible with the first material. The subplate is fixedly secured relative to the forward end face and a hardened facing is fixedly secured to the outer end face of the subplate. The subplate and facing include means for allowing the extrusion parts to communicate therethrough.

In accordance with another aspect of the present invention, the subplate is constructed from the same material as the die body and is fixedly secured thereto so as to form a substantially integral relationship therewith. The layer of insulating material is thus located internally of the die body assembly so as to not interfere with extruding operations.

In accordance with another aspect of the present invention, one of the die body forward end face and the subplate includes a cavity-like configuration at least at the area of the extrusion ports. The insulating material which is a part of the die is at least disposed within this cavity. In one embodiment, the other of the die body forward end face and subplate is configured to be at least partially received in the cavity.

In accordance with a more limited aspect of the present invention, at least a portion of the walls of a heating fluid flow channel in the die body adjacent the forward end face include a layer of insulating material. In addition, the forward end face of the die body itself adjacent the facing may be similarly insulated.

The principal object of the present invention is the provision of a new and improved internally insulated extrusion die which generally eliminates die freeze off.

Another object of the present invention is the provision of an insulated extrusion die wherein the insulation will not be affected or worn away by normal die use.

Still another object of the present invention is the provision of an insulated extrusion die wherein the insulation is located closely adjacent the interface between the die body forward end face and a hardened facing material.

Other objects and advantages to the subject invention will become apparent to those skilled in the art upon a reading and understanding of the following specification.

BRIEF DESCRIPTION OF THE DRAWINGS

The invention may take physical form in certain parts and arrangements of parts, a preferred and an alternative embodiment of which will be described in detail in the specification and illustrated in the accompanying drawings which form a part hereof and wherein.

DETAILED DESCRIPTION OF A PREFERRED AND ALTERNATIVE EMBODIMENT

Figure 1:
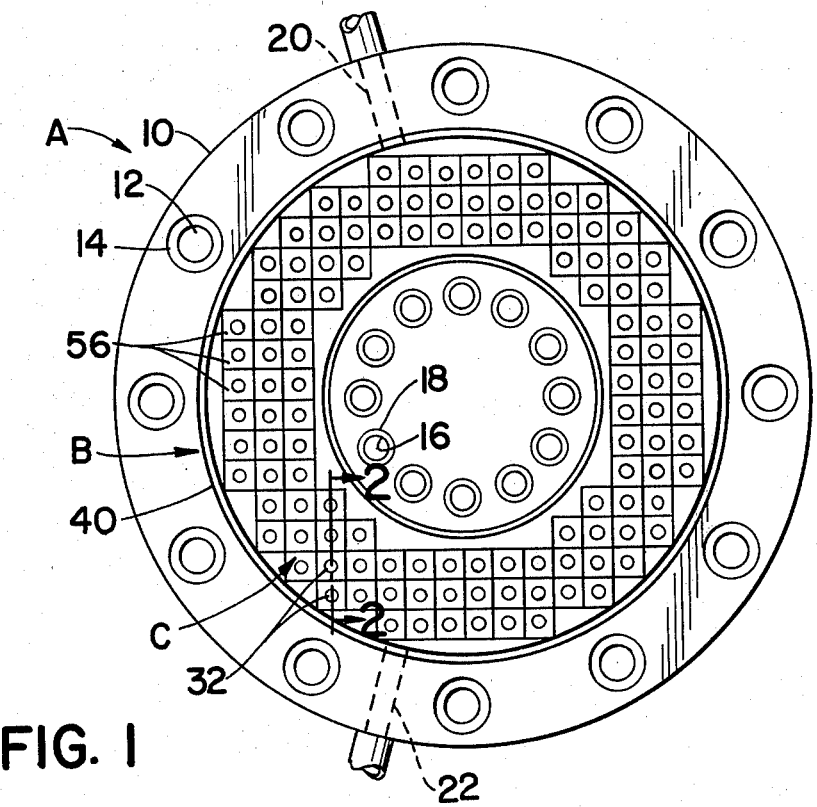
FIG. 1 is an end view of an extrusion die utilized in a so-called pelletizing extrusion process and incorporates the concepts of the subject invention therein.
Figures 2, 3:
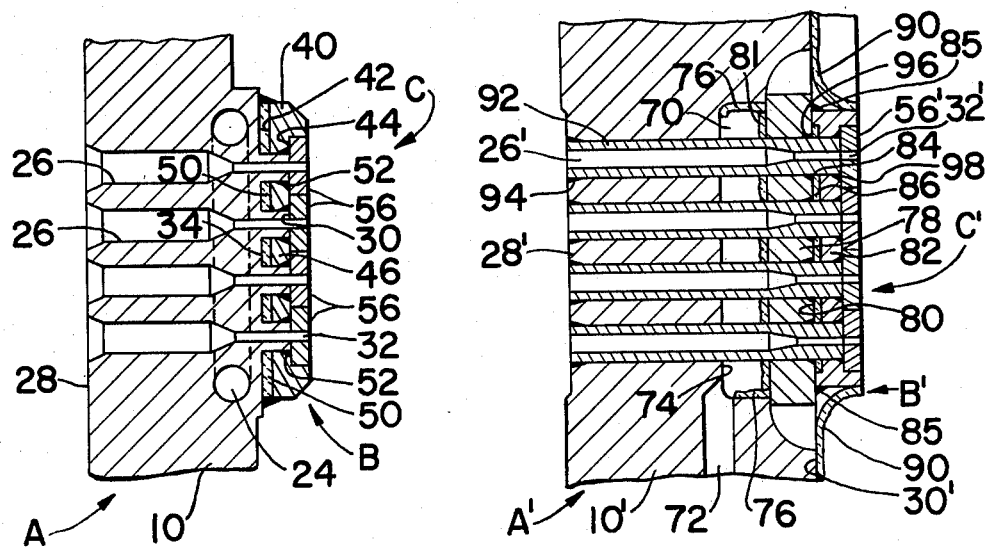
FIG. 2 is a cross-sectional view taken along lines 2—2 of FIG. 1.
FIG. 3 is a cross-sectional view similar to FIG. 2 showing a modified die construction which incorporates the concepts of the subject invention.

Referring now to the drawings wherein the showings are for purposes of illustrating a preferred and an alternative embodiment of the invention only and not for purposes of limiting same, FIGS. 1 and 2 show an extrusion die construction comprised of a die body A, a top or subplate B secured to the forward end face of the die body and a facing C secured to the outwardly disposed surface of top or subplate B. The overall extrusion die is adapted for use with conventional extruder apparatus (not shown). Since the extruder itself is conventional and does not itself comprise a part of the present invention, it is not shown or described herein. However, in the preferred environment of use for the subject invention, a synthetic resin or polymeric material is extruded through die body A toward facing C with the interior of the die body being maintained at an elevated temperature. Facing C is disposed in communication with or submerged in a cooling bath of water or other liquid which is maintained at a substantially lower temperature than the interior of die body A. As the resin is extruded through facing C, the material is transformed from a liquid or flowable state to a solid state and then cut into pellets by a knife which periodically wipes across facing C. This process is commonly referred to in the trade as underwater pelletizing.

More particularly, and with continued reference to FIGS. 1 and 2, die body A is defined by a generally cylindrical body 10 having a plurality of threaded fasteners 12 received in axially disposed counterbored openings 14 adjacent the outer circumference thereof for purposes of mounting the die body to an extruder. In addition, a plurality of threaded fasteners 16 received in counterbored openings 18 adjacent the center area of the die body are also used for mounting purposes. In some instances, protective rings or covers (not shown) are closely received over fasteners and openings 12,14 and fasteners and openings 16,18. These rings or covers are fixedly secured to the die body to prevent extruded material from filling counterbored openings 14,18 and provide exterior insulation.

Radial passageways 20,22 (FIG. 1) penetrate the interior of body 10 from the outer circumference thereof for allowing ingress and egress of the heating medium or heating fluid as is conventional with this type of extrusion. These passageways, in turn, communicate with internal passageways and one such passageway is designated 24 in FIG. 2. Since the internal passageways function to maintain the polymeric material in a liquid or flowable state as it is extruded through the die, they are disposed in close heating communication with a plurality of extrusion ports generally designated 26 in FIG. 2. Although four such ports are shown in the cross-sectional view of FIG. 2, it will be appreciated that many additional ones are included in the overall die body over a generally annular portion thereof. Typically, steam or hot oil is employed as the heating medium or fluid and is introduced into and removed from internal passageways 24 by means of radial passages 20,22.

The plurality of extrusion ports 26 extend axially of body 10 from an inner or rearward face 28 to an outer or forward face 30. The extrusion ports neck down along the length thereof at an area spaced toward outer or forward face 30 so as to define extrusion orifices 32 adjacent facing C. In the embodiment shown, the die body includes axially inward extending grooves or slots at forward face 30 which define a receiving web or cavity about and intermediate extrusion orifices 32 for purposes of receiving top or subplate B as will be described. Typically, die body A is constructed from tool or stainless steel.

Top or subplate B is comprised of an annular body 40 (FIG. 1) having opposed inner and outer faces 42,44 (FIG. 2). The central portion of annular body 40 is comprised of web-like members with the individual webs designated 46 in FIG. 2 and dimensioned to be at least partially received in body grooves or slots 34. For reasons which will become apparent, top or subplate B is preferably and desirably constructed from the same material as die body A to eliminate uneven expansion and contraction therebetween during die use.

As shown in FIG. 2, a layer of insulating material 50 is interposed between the bottom area of the receiving web or cavity defined by grooves or slots 34 and subplate inner face 42 as defined by web-like members 46. As shown in this FIGURE, insulating material is also interposed between die body 10 and subplate body 40 adjacent the peripheral edges of inner face 42. The insulation itself may be comprised of a ceramic type material or any other material which is suitable for high temperature applications and has insulating characteristics. In the preferred embodiment here under discussion, zirconium oxide (zirconia) is preferred. The insulation may be sprayed or otherwise conveniently applied to a suitable, effective thickness on either or both of slots 34 and web-like members 46.

With the insulation material applied as described above and with the die body 10, insulation 50 and top or subplate body 40 relatively positioned as shown in FIG. 2, the subplate is welded or fused to the die body as at weld areas 52. This welding is such that the die body and subplate become a relatively integral structure. Without such an integral structure, facing C could not be successfully bonded to the subplate due to the differences in thermal expansion between the subplate material and the facing material during the bonding operation. As will be seen in FIG. 2, and with the subplate fused to the die body to achieve a substantially integral structure, the layer of insulation material 50 acts as an internal insulator which is protected from contact with the other die components. Thus, the insulation material will not be worn away or otherwise deteriorate during extruding operations.

Facing C is desirably constructed from a material which is much harder than the material of the die body and subplate. This construction is for purposes of reducing facing wear due to periodic wiping contact across the outer surface thereof by a knife (not shown) during a pelletizing process. Tungsten carbide tiles generally designated 56 in both FIGS. 1 and 2 are preferred and these tiles may be conveniently brazed to outer face 44 of subplate body 40. As will be noted from FIG. 1, the individual tungsten carbide tiles 56 include openings which define extrusion orifices 32 therethrough. The specific means used to affix tiles 56 to the subplate do not form a specific part of the present invention. However, an appropriate affixing means and a method for same are disclosed in the commonly assigned U.S. Pat. No. 3,271,822. Other constructions and materials for facing C as well as the means for affixing same to subplate B may be advantageously employed without in any way departing from the overall intent and scope of the invention.

In operation, the interior of die body 10 is maintained at a substantially elevated temperature by means of a heating medium or fluid such as steam which is continuously passed through internal passageways 24 by means of radial passages 20,22. Heat from the heating medium or fluid is transferred through body 10 from the internal passageways to the extrusion ports and orifices 26,32 in order to maintain synthetic resins or polymeric material forced therethrough from rearward face 28 toward and outwardly from facing C in a liquid or flowable state. Some of the heating medium heat is also transferred to other parts of the die body.

Heretofore, so-called "freeze off" problems have occurred in the areas of extrusion ports and/or orifices 26,32 adjacent the facing. This result was due to the fact that the typically employed tungsten carbide tiles have a greater heat transfer coefficient than the material of the die body so as to rapidly draw off die body heat. The rate of such heat loss is increased due to the fact that the facing is typically submerged in a cooling bath such as water or the like to transform the extruded polymeric material into a hardened state substantially simultaneous with its exit from extrusion orifices 32. When the heat loss becomes sufficiently great, it allows the polymeric material being extruded to cool into a hardened or non-flowable state prior to exiting extrusion orifices 32 at facing C. The occurrence of freeze off causes individual ones of the orifices to become plugged and effects a reduction in production capacity for the die. Production capacity is reduced further as additional extrusion orifices become plugged so that ultimately, the die must be removed from service to facilitate orifice unplugging and cleaning.

With the subject invention, however, an internal layer of insulation material 50 is disposed closely adjacent facing C to reduce or inhibit heat transfer from die body A to facing C during extruding operations. This, in turn, allows the die body to remain at sufficiently elevated temperatures at the area of the extrusion ports and orifices to prevent undesired hardening of the polymeric material therein. This result is enhanced by the fact that the insulation material 50 is disposed closely adjacent both facing C and outer or forward face 30 of body 10. Thus, the insulation does not inhibit or retard heat transfer within the die body at the area of extrusion ports and/or orifices 26,32. With additional heat retained in the die body and not so readily drawn off by the facing structure, the above described freeze off problems encountered with prior extrusion dies of this general type are greatly reduced and/or eliminated. The subject invention therefore provides substantially improved results over prior such dies during extruding operations.

FIG. 3 is a view similar to FIG. 2 showing a modified structural arrangement incorporating the overall concepts of the subject invention. For ease of illustrating and appreciating this modification, like components are identified by like numerals with a primed (') suffix and new components are identified by new numerals.

Here, cylindrical body 10' of die body A' includes a counterbored cavity generally designated 70 extending inwardly from forward face 30'. A radial heating medium entry or exit passage 72 communicates with cavity 70. A heating chamber 74 is defined by a portion of cavity 70 and includes a layer of insulating material 76 at least at the outer peripheral surfaces thereof. As in the arrangement shown in FIG. 2, this insulating material may be sprayed or otherwise applied in the cavity to a convenient thickness prior to assembly of the other extrusion die components to body 10'. Insulation 76 retards or reduces heat loss from heating chamber 74 to the die body at areas thereof remote from the extrusion ports and orifices.

A base plate 78 is received within the counterbored portion of cavity 70 and is fixedly secured to cylindrical body 10' as by welding or the like so that the inner face thereof defines one wall of heating chamber 74. Base plate 78 is constructed from the same material as body 10' and is fixedly secured to the body so that the two components will comprise a substantially integral structure. Outer face 80 of base plate 78 thus defines a portion of an outer or forward face 30' for the die body in the same manner as does integral face 30 of the FIG. 2 embodiment. A layer of insulating material 81 is advantageously applied to the inner face of base plate 78 which defines a wall of the heating chamber 74.

Subplate B' again comprises a generally ring like member 82 having opposed end faces with the inner face including a cavity area therein which is generally designated 84. Insulating material 86 is located in this cavity so that here too, a layer of insulating material is interposed between forward face 80 of the die body and the body of the subplate. This insulating material may comprise any suitable material having insulating characteristics and adapted for high temperature applications. In this alternative embodiment, however, zirconium oxide (zirconia) is again preferred. Subplate B' is constructed from the same or a wholly compatible material as body 10' and base plate 78. Moreover, the subplate is fixedly secured to base plate 78 by welding or the like as at areas designated 85 in order that it will become a relatively or substantially integral structure with the die body and base plate.

Facing C' is constructed from a material having a much greater hardness than the die body components and is fixedly secured by convenient means to the outer face or surface of subplate body 82. Tungsten carbide tiles 86 having extrusion orifices 32' extending therethrough are preferred for the facing as hereinabove previously described. Also in the embodiment of FIG. 3, a layer of insulating material 90 can be applied by convenient means and to a sufficient thickness so as to extend from the side walls of subplate body 10'. Because facing C' is spaced axially outward from die body forward face 30', insulation 90 will not be contacted by the knife during an extrusion pelletizing process. While shown in the FIGURE, application of insulation 90 is generally considered to be optional. However, such insulation further retards, inhibits and/or reduces heat transfer from the die body to facing C' or the cooling bath in which the facing is submerged.

FIG. 3 further utilizes a slightly modified arrangement for defining extrusion ports 26' and extrusion orifices 32'. Here, the pots and orifices are included in separate tubular members 92 extending from inner or rearward face 28' of cylindrical body 10', through heating chamber 74 and to the outer face or surface of subplate body 82 at the area of mounting of tungsten carbide tiles 56'. Tubes 92 are conveniently fixedly welded to die body A', base plate 78 and subplate B' as at weld areas designated 94,96 and 98, respectively. Weld areas 98 also act as seals between the interior of the die body and facing C'.

While the specific die construction shown in FIG. 3 differs from that shown in FIG. 2, the overall results obtained therefrom are substantially identical. That is, an internally insulated extrusion die as at the area of insulating layer 86 is provided for purposes of preventing extrusion orifice freeze off. Further, however, insulating material 76 is provided in selected areas of heating chamber 74 and insulating material 90 can be provided at forward face 30' of cylindrical body 10'. This additional insulation further inhibits or reduces heat transfer through the die body and outwardly therefrom.

The invention has been described with reference to a preferred and an alternative embodiment. Obviously, modifications and alterations will occur to others upon the reading and understanding of this specification. As the subject invention primarily resides in providing an internally insulated extrusion die, it is intended that all such modifications and alterations will be included insofar as they come within the scope of the appended claims or the equivalents thereof.

Having thus described the invention, it is now claimed:

1. An internally, doubly insulated extrusion die comprising:

a die body constructed from a first material and having a rearward face, an oppositely disposed forward end face, a plurality of extrusion ports extending therethrough between the rearward and forward end faces, a heating fluid flow channel disposed therein adjacent the forward end face in a heat transfer relationship with the extrusion ports whereby a heated fluid passing through the channel is adapted to transfer heat to a material being extruded through the extrusion ports, and heating fluid flow channel having a rearwardly facing wall portion disposed adjacent and generally parallel with the forward end face;

a first layer of a first insulating material disposed on the wall portion in close proximity and generally parallel to the forward end face for reducing heat transfer from the heated fluid toward the forward end face;

a second layer of said first material forming a part of said die body, said wall portion and said forward end face, and said first and second layers having said extrusion ports passing therethrough;

a third layer of second insulating material disposed contiguous to and forwardly of the forward end face to inhibit heat transfer from the die body and a plurality of openings extending through said third layer and disposed in alignment with said extrusion ports to allow communication of the extruded material therethrough;

a subplate forming a fourth layer having an inner face disposed contiguous with the second insulating material third layer and substantially parallel to the forward end face, an outer end face oppositely disposed to the inner face, a plurality of openings extending between the inner and outer faces and disposed in alignment with said extrusion ports to allow communication of the extruded material therethrough, and the subplate being constructed of the first material and being fixedly connected with the die body;

a fifth layer of facing material fixedly secured to the subplate outer face substantially parallel to the die body forward end face at least in an area around the extrusion ports and having holes therein to allow extruded material to pass therethrough, and the fifth layer of facing material being constructed of a second material which is harder than the first material such that the facing material is relatively wear resistant; and the extrusion die having a layered structure between the heating fluid flow channel and the exterior of the facing which serially includes in a substantially parallel relationship the first insulating material first layer, the second layer of the first material, the second insulating material third layer, the fourth layer of the first material, and the fifth layer of the second material, respectively.

2. The extrusion die as defined in claim 1 wherein said first and second insulating materials comprise zirconium oxide.

3. The extrusion die as defined in claim 1 further including a receiving cavity in one of said die body forward end face and subplate at least at the area of said extrusion ports, said second insulating layer and at least a portion of the other of said die body forward end face and subplate being disposed in said receiving cavity.

* * * * *